Nov. 11, 1969  E. C. KELLER  3,477,983
FRICTION ELEMENTS
Filed June 23, 1966  2 Sheets-Sheet 1
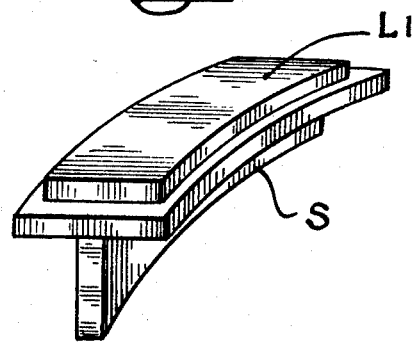
Fig.1
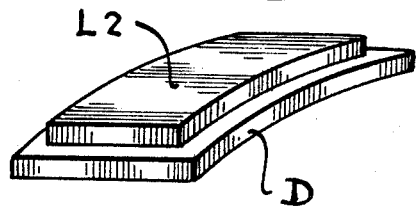
Fig.2
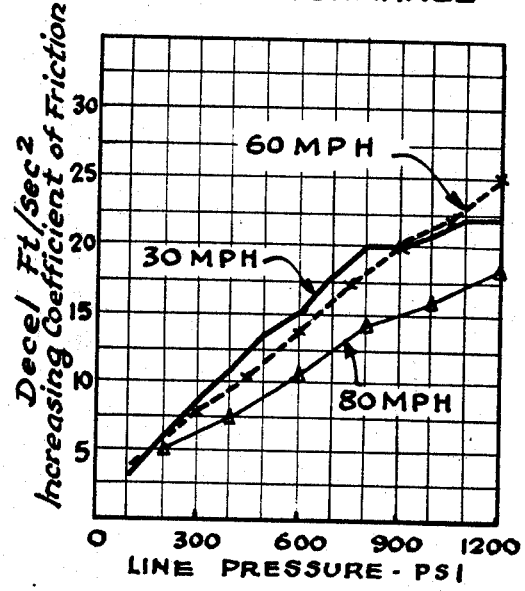
Fig.3 (CuS)
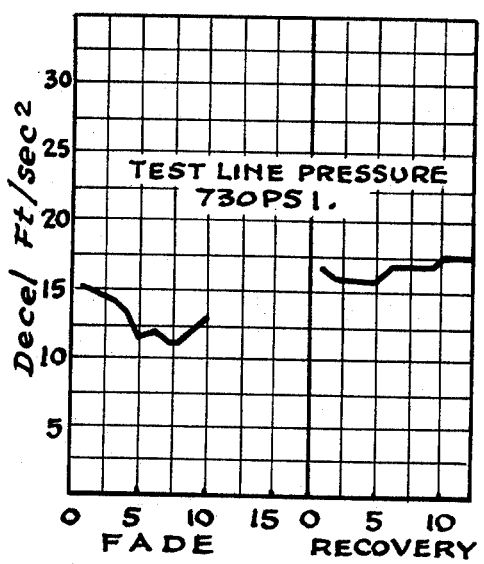
Fig.4 (CuS)
Inventor
Emil C. Keller
By Wallace, Kinzer and Dorn
Attorneys

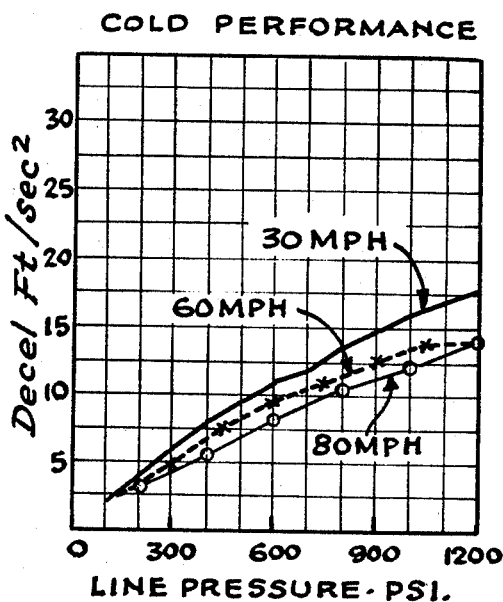
Fig.5 (CuO)
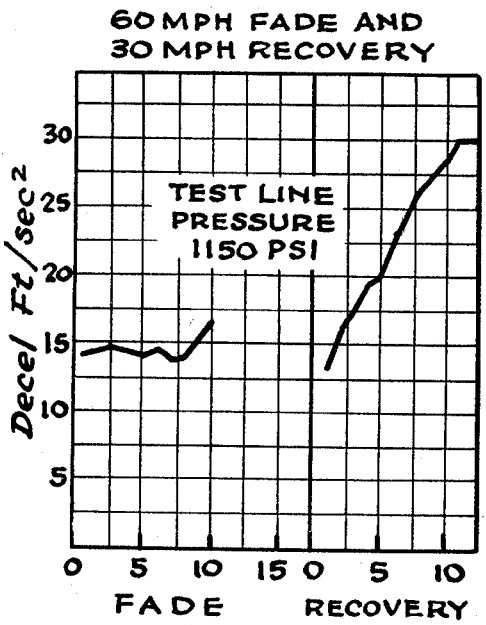
Fig.6 (CuO)
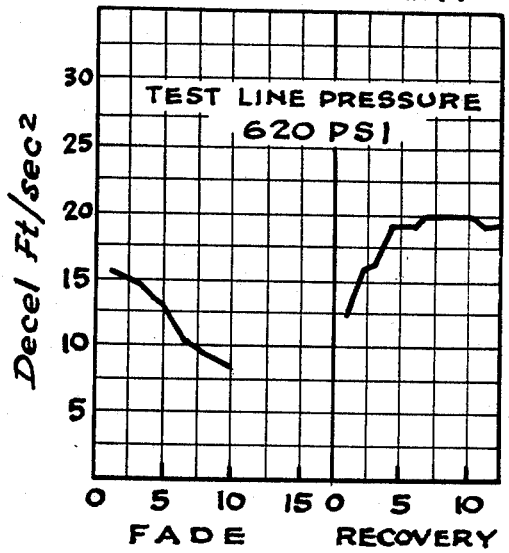
Fig.7 ($Cu_2S$)

United States Patent Office 3,477,983
Patented Nov. 11, 1969

3,477,983
FRICTION ELEMENTS
Emil C. Keller, Mahwah, N.J., assignor to Abex Corporation, New York, N.Y., a corporation of Delaware
Filed June 23, 1966, Ser. No. 559,877
Int. Cl. C09k *3/14;* F16d *69/02*
U.S. Cl. 260—38
2 Claims This invention relates to friction elements of the automotive type, and more particularly to a composition brake lining (non-metallic) to be secured to a supporting shoe or disc.

With increasing speeds of automotive vehicles, it becomes more and more important to achieve superior braking action, particularly since braking at higher speeds is accompanied by the generation of higher temperatures of the engaged faces of the lining and the brake rotor which is a rotating drum or disc or against which the brake lining is forced when the brakes are applied. To a measure, the ability of the friction element to withstand such severe conditions has been enhanced by resorting to heat conductive metallic chips dispersed along with asbestos and other inorganic fillers in a heat-resistant organic binder.

Thus, the binder, for superior resistance to thermal degradation, includes an appreciable amount of relatively hard and heat-resistant phenol-formaldehyde, although it is customary to include some rubber for high friction. Metallic chips, such as brass chips, are used as heat conductors to conduct heat from the organic binder into the metal disc or shoe to which the lining is secured, and to this extent at least the life of the binder is lengthened against thermal degradation.

A peculiar phenomenon encountered with non-metallic or so-called composition friction elements is that of a tendency toward "fade" which is the inability to maintain a reasonably constant value of friction (fade out of friction) during repeated application of the brakes at a given speed, equivalent to repeated use of the brakes when descending a steep grade, resulting in overheated brake linings. All linings of the composition type exhibit this to a greater or lesser degree. In most instances, a more thermally stable binder and the inclusion of heat conductive particles in the brake lining will contribute toward less fade tendency. When testing for fade, it is customary to do so under conditions where the lining is given no chance to cool to ambient temperature between repeated brake applications, thereby simulating an equivalent road condition.

A phenomenon related to brake lining fade is "recovery." This signifies the ability of a brake lining to recover or maintain a normal friction level after a fade condition. In testing for recovery it is customary to allow the same lining to cool after a fade test thereon, and then repeated brake applications are made with the lining allowed to cool between each test stop.

Of course a high friction level, consistent with uniform and acceptable brake action, is important. In this connection, one would ordinarily expect to find that an abrasive, such as an oxide compatible with an organic binder, would enhance friction of an automotive brake lining, but peculiarly enough I have found that if cupric sulphide (CuS) is included in a composition friction element of the automotive type, superior results are achieved from the standpoint of friction, and friction stability measured in terms of recovery, and so to do is the object of the present invention. I have also found that cuprous sulphide ($Cu_2S$) does not contribute the benefits of cupric sulphide.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent changes may be made as desired by those skilled in the art without departing from the present invention.

In the drawings:

FIGS. 1 and 2 are schematic views showing the manner in which friction elements of the present invention may be mounted in use; and FIGS. 3 through 7 are graphs portraying test performance of brake linings hereinafter described from the standpoint of composition.

Friction elements or linings contemplated by the present invention are of a geometric form to be fastened either to the curved surface of an ordinary automotive brake shoe, where the lining is pressed against the internal surface of the rotating drum of the car wheel, or of the segmented form to be fastened on one face of a stator disc and pressed against a rotor disc fastened to the car wheel. The first kind of lining is identified as L1 in FIG. 1, fastened to the shoe S, and the second kind of lining is shown as L2 in FIG. 2, fastened to the stator disc D.

FIGS. 3 and 4 are graphs showing the performance of a disc brake structure under test conditions having a lining as L2 produced in accordance with the present invention; and FIGS. 5 and 6 are graphs of the same order showing test results of the identical disc brake structure under the same test conditions but having a lining as L2 of a different composition. The two linings were processed identically, except that the lining charted in FIGS. 3 and 4 contained cupric sulphide, whereas the lining charted in FIGS. 5 and 6 contained cupric oxide fully equivalent in content to the other lining.

Referring to FIGS. 3 and 5, it will be noted that these two graphs portray the ability of the corresponding linings to produce a complete stop of the vehicle at 30 m.p.h., 60 m.p.h. and 80 m.p.h. The hydraulic line pressure (pounds per square inch) used to initiate the stop is shown versus the degree of deceleration—feet per second per second. It will be observed that at all speeds, the lining containing cupric sulphide (FIG. 3) excelled materially in comparison to the one containing cupric oxide (FIG. 5). It may be noted that after concluding these two tests, the linings were measured for the extent of wear, and while it was determined that the lining containing cupric oxide was worn approximately twelve-hundredths of an inch less than the one containing cupric sulphide, this difference is deemed immaterial; in fact the far superior decelerating ability of the latter is deemed of critical importance to automotive engineers as between the two comparisons.

Of further significance in this regard is the fact that further testing revealed that the lining containing cupric oxide wore the opposing stator of the test brake at four times the rate of the lining containing cupric sulphide (0.0004 inch versus 0.0001 inch).

Fade and recovery tests are of significance only when considered together. Thus, a fade and recovery test simulates the condition where the brakes are applied repeatedly at high speeds resulting in overheated linings with little rest between stops, (fade) and followed by repeated application of the brakes at a lower speed after the brake linings have cooled (recovery). This would correspond to breaking on a long, steep grade followed by normal driving in city or town traffic. It is customary to conduct the fade phase of this test (hot lining) at 60 m.p.h. and the recovery phase (cool lining) at 30 m.p.h. For the recovery phase, a line pressure for applying the brakes hydraulically is selected as that which is required to produce the average deceleration encountered in the fade phase.

The lining containing cupric oxide and the lining containing cupric sulphide exhibited satisfactory fade performance, but referring to FIGS. 4 and 6 it is evident that the cupric oxide (FIG. 6) lining displays pronounced instability during recovery. Higher line pressures were required for the cupric oxide lining (1150 p.s.i. FIG. 6) to produce an initial deceleration of approximately fifteen feet per second, per second, confirming its inferior friction in comparison to the lining containing cupric sulphide. An unacceptable over-recovery was encountered with the cupric oxide lining, evidenced by the steep gradient of the recovery line in FIG. 6. This would correspond to a driver hazard in that the brake action would be jerky and produce a too-sudden stop, and in all likelihood a dangerous skid.

In comparison, the recovery line for the lining containing cupric sulphide (FIG. 4) was virtually horizontal on average, and a much lower line pressure was required to approximate an inital deceleration of fifteen feet per second, per second.

Similar testing for a lining containing cuprous sulphide ($Cu_2S$) revealed a wear rate for the lining and wearing of the opposed rotor far in excess of that encountered with the lining containing cupric sulphide, without any marked benefit in friction. In fact, the wear on the rotor was at an eighty-seven fold increase. Unacceptable instability during recovery was also encountered with the lining containing cuprous sulphide, as shown in FIG. 7.

As noted above, I am concerned principally with a composition friction element in which the binder is organic in nature, but heat resistant. The essential ingredient of the binder is a phenol-formaldehyde resin, or equivalent thermosetting resin, but preferably a good heat resistant rubber, such as butadiene acrylonitrile synthetic rubber, is also included in the binder. The rubber imparts enhanced friction to the lining and at the same time lessens wear on the opposing brake member; and where rubber is present, it is advantageous to use a conventional rubber curing agent such as white lead which also prevents swelling of the rubber during compounding, together with accelerators such as sulphur and Altax.

Asbestos is used as a heat resistant strengthener and filler, and an additional relatively hard mineral type filler such as barytes may be included. Metallic particles may be used to impart further resistance to heat, and I prefer brass chips in this regard. Graphite, a conventional ingredient in automotive linings, is included as a friction modifier, that is, graphite or equivalent lubricant such as molybdenum sulphide or lead sulphide, serves to produce smooth brake action. The following example represents the preferred practice of the present invention and represents that for which performance is shown in FIGS. 3 and 5:

Example 1

| Material— | Parts by weight |
|---|---|
| Binder: | |
|   Buna N rubber | 8 |
|   Phenol formaldehyde resin (liquid "A" stage) | 7 |
| Fillers: | |
|   Barytes | 2.5 |
|   Graphite | 7 |
|   Asbestos fibers | 35 |
|   Brass chips | 13 |
|   Cupric sulphide | 12.5 |
|   White lead (rubber cure) | 11.5 |

In processing, the rubber is dissolved in a solvent consisting of four parts by weight of methyl ethyl ketone, seven parts hydrogenated naphtha and one-half part of water. The phenolic resin is then added, and when the mixture is of a uniform consistency, the remaining ingredients except asbestos are added.

After a uniform consistency has again been attained, the asbestos fibers are added in increments while maintaining uniform consistency. The wet mixture is then dried to remove the solvent.

Following this, selected amounts of the mixture can then be placed in a die cavity which presents the desired geometry for the friction element, and subjected to the amount of pressure which will afford the desired density. The press conditions for partially curing the rubber-resin binder are about 325° for twenty to sixty minutes depending upon the thickness of the lining.

Following this partial cure under pressure, the lining is removed from the die and subjected to a final cure of about 375° F. for seven hours for each one-half inch thickness of lining.

Alternatively, the material can be pressed and cured in sheets, following the above procedure, and individual friction elements cut therefrom.

The linings for which performance is shown in FIGS. 4, 6 and 7 were prepared in accordance with the foregoing disclosure concerning Example 1, except that cupric sulphide was replaced by equal parts by weight of cupric oxide and cuprous sulphide respectively.

The invention is by no means limited to the precise example set forth above, since it is evident that the cupric sulphide is an ingredient which will raise and stabilize friction while producing relatively little wear on the opposing member. For example, I can omit barytes as a filler while raising the asbestos content, and wide variations are possible with the remaining ingredients in accordance with the following:

Example 2

| Material: | Parts by weight |
|---|---|
| Buna N rubber | 3–8 |
| Phenol-formaldehyde resin (liquid "A" stage) | 5–12 |
| Barytes | 0–5 |
| Graphite | 5–10 |
| Asbestos fibers | 15–50 |
| Brass chips | 5–25 |
| White lead (rubber cure) | 4–11.5 |
| Cupric sulphide | 7.5–20 |

The barytes can be replaced by an equivalent amount of an equivalent inert mineral filler such as talc or marble dust, and the graphite can be replaced by an equivalent amount of an equivalent carbonaceous filler such as coke or charcoal. If desired, friction can be further enhanced by including shredded soft rubber and/or cashew nut shell polymer in solid form.

Therefore, while I have described my invention from the standpoint of a complete composition which displays profoundly superior brake performance, it is to be appreciated that ingredients other than cupric sulphide can be substituted where it is desired to take advantage of the effect of cupric sulphide in accordance with my invention while maintaining the basic requirement of an organic binder which is heat resistant in form, fillers which are heat resistant in form including asbestos as a strengthener and graphite as a friction modifier, and metallic particles which are heat conductive in form.

Hence, while I have illustrated and described preferred embodiments of my invention, it is to be understood that these are capable of variation and modification.

I claim:
1. An automotive brake lining comprising a heat resistant organic binder and inorganic fillers incorporated therein, and containing cupric sulfide in an amount sufficient to improve the recovery properties and frictional characteristics of the composition.
2. A brake lining according to claim 1 wherein the binder is in the form of a mixture of phenol-formaldehyde resin and butadiene acrylonitrile rubber, wherein the fillers include asbestos as a strengthener and graphite as a friction modifier, a mineral filler in the form of barytes, and containing a heat conductive metal in the form of brass particles.

References Cited

UNITED STATES PATENTS

| | | | |
|---|---|---|---|
| 2,052,779 | 9/1936 | Lidkea et al. | 106—7.5 |
| 2,284,785 | 6/1942 | Wilkey | 106—36 |
| 3,007,890 | 11/1961 | Twiss et al. | 260—38 |
| 3,168,487 | 2/1965 | Spokes et al. | 260—3 |

OTHER REFERENCES

Chemical Abstracts, vol. 60:12998 f, 1964.

MORRIS LIEBMAN, Primary Examiner

S. L. FOX, Assistant Examiner

U.S. Cl. X.R.

106—36